US009151971B2

(12) United States Patent
Wu (10) Patent No.: US 9,151,971 B2
(45) Date of Patent: Oct. 6, 2015

(54) LIQUID CRYSTAL LENS AND STEREOSCOPIC DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 14/362,470

(22) PCT Filed: Dec. 5, 2013

(86) PCT No.: PCT/CN2013/088575
§ 371 (c)(1),
(2) Date: Jun. 3, 2014

(87) PCT Pub. No.: WO2015/039384
PCT Pub. Date: Mar. 26, 2015

(65) Prior Publication Data
US 2015/0077668 A1    Mar. 19, 2015

(30) Foreign Application Priority Data
Sep. 17, 2013  (CN) .......................... 2013 1 0425566

(51) Int. Cl.
*G02F 1/13* (2006.01)
*G02F 1/1335* (2006.01)
(Continued)

(52) U.S. Cl.
CPC ........ *G02F 1/13306* (2013.01); *G02B 27/2214* (2013.01)

(58) Field of Classification Search
CPC .... G02B 27/2214; G02B 27/26; G02B 27/22; G02B 1/041; G02B 27/2228; G02B 27/225; G02B 27/2264; G02B 27/0093; G02B 27/2207; G02B 3/14; G02B 6/0036; G02F 1/134309; G02F 1/29; G02F 2001/294
USPC ..................................................... 349/15, 95
See application file for complete search history.

(56) References Cited

U.S. PATENT DOCUMENTS 8,300,206 B2 * 10/2012 Kim et al. ...................... 349/202
2008/0266473 A1 * 10/2008 Osawa et al. .................... 349/33
(Continued)

FOREIGN PATENT DOCUMENTS

CN     101458414 A    6/2009
CN     102736352 A   10/2012
(Continued)

OTHER PUBLICATIONS

International Search Report, International Preliminary Report on Patentability and Written Opinion of the International Searching Authority of PCT/CN2013/088575 in Chinese, mailed May 6, 2014.
(Continued)

*Primary Examiner* — Hoan C Nguyen
(74) *Attorney, Agent, or Firm* — Collard & Roe, P.C.

(57) ABSTRACT

A liquid crystal lens is comprises: a plurality of lens units (1), and a driver circuit electrically-connected with the plurality of lens units respectively; each lens unit comprises: a common electrode (11), a signal electrode opposite to the common electrode, and a liquid crystal layer provided between the common electrode and the signal electrode; each signal electrode comprises: one or two conductive wires (25) with one end being electrically-connected to the driver circuit, and a resistive block (22) provided on a second substrate and opposite to the common electrode. The resistive block is electrically-connected with the conductive wire(s). Where the driver circuit applies a drive voltage through the conductive wire(s) to the resistive block, the liquid crystal layer provided between the resistive block and the common electrode has a lens function. A stereoscopic display device comprising a same liquid crystal lens is also disclosed.

20 Claims, 5 Drawing Sheets (51) Int. Cl.
    *G02F 1/133* (2006.01)
    *G02B 27/22* (2006.01)

(56) References Cited

U.S. PATENT DOCUMENTS

| | | |
|---|---|---|
| 2011/0234954 A1 | 9/2011 | Hsu et al. |
| 2012/0293503 A1 | 11/2012 | Miyazawa et al. |
| 2013/0188118 A1 | 7/2013 | Oka et al. |
| 2013/0215001 A1 | 8/2013 | Oka et al. |
| 2013/0235305 A1 | 9/2013 | Takama et al. |
| 2014/0176834 A1* | 6/2014 | JEN et al. .................. 349/15 |

FOREIGN PATENT DOCUMENTS

| | | |
|---|---|---|
| CN | 102809865 A | 12/2012 |
| CN | 103217822 A | 7/2013 |
| CN | 103257486 A | 8/2013 |
| CN | 103293819 A | 9/2013 |
| CN | 103472652 A | 12/2013 |
| CN | 203480185 U | 3/2014 |
| TW | 201133038 A | 10/2011 |

OTHER PUBLICATIONS

Chinese Office Action of Chinese Application No. 201310425566.4 with English translation, issued Jun. 23, 2014.

Notification to Grant the Patent Right (Notice of Allowance) of Chinese Application No. 201310425566.4 with English translation, issued Aug. 29, 2014.

English Translation of the International Search Report of PCT/CN2013/088575 published in English on Mar. 26, 2015.

* cited by examiner

LIQUID CRYSTAL LENS AND STEREOSCOPIC DISPLAY DEVICE

CROSS REFERENCE TO RELATED APPLICATIONS

This application is the National Stage of PCT/CN2013/088575 filed on Dec. 5, 2013, which claims priority under 35 U.S.C. §119 of Chinese Application No. 201310425566.4 filed on Sep. 17, 2013, the disclosure of which is incorporated by reference.

TECHNICAL FIELD

Embodiments of the present invention relate to a liquid crystal lens and a stereoscopic display device.

BACKGROUND

The main principle of stereoscopic display technology is to allow a viewer's left and right eyes to receive different images respectively, and the images received by the left and right eyes are analyzed and combined in brain, so that the viewer can have the senses of levels and depth of a displayed picture, and thus perceives a stereoscopic impression. Therefore, in order to make a display panel have a stereoscopic image display effect, it is necessary to provide a pair of images, one of which is only for left eye and the other is only for right eye, for same one picture, so as to achieve a stereoscopic display effect.

Currently, a approach commonly used for achieving stereoscopic display is to provide a liquid crystal lens in front of a display panel. The liquid crystal lens, by controlling the arrangement of liquid crystal molecules, causes a liquid crystal layer to have gradient refractive indices, so that the liquid crystal layer has a lens effect. For controlling the arrangement of liquid crystal molecules, a gradient electric field is needed.

Figure 1:
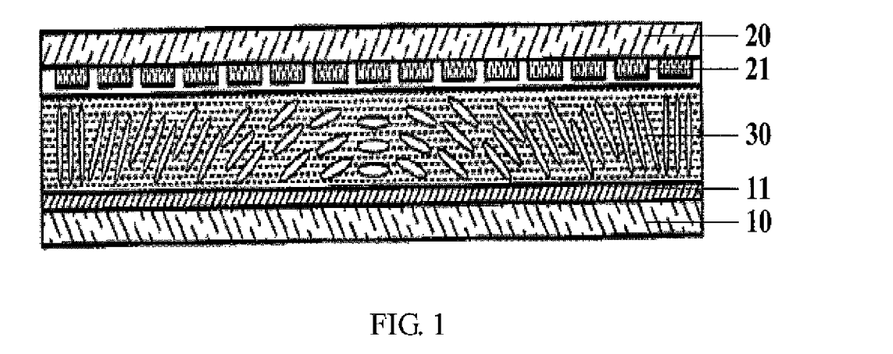
FIG. 1 is a schematic structural diagram of a liquid crystal lens in the prior art.

As illustrated in FIG. 1, it is a schematic structural diagram of a liquid crystal lens in the prior art; the liquid crystal lens comprises: a first substrate 10 and a second substrate 20 which are provided opposite to each other, and a liquid crystal layer 30 filled between the first substrate 10 and the second substrate 20. On the surface of the first substrate 10 facing the second substrate 20, there is provided a common electrode 11, and on the surface of the second substrate 20 facing the first substrate 10, there are provided a plurality of strip-like electrodes 21 arranged at an equal interval. The liquid crystal lens further comprises a driver circuit (not shown), which is electrically-connected with the plurality of strip-like electrodes respectively. When the liquid crystal lens is in an energized state, each strip-like electrode 21 with cooperation of the common electrode 11 forms an electric field therebetween. By utilizing birefringence characteristic of liquid crystal molecules, as well as the light-focusing/diverging characteristic of liquid crystal molecules along with changes of electric-field intensity, and by using the driver circuit to apply different drive voltages to individual strip-like electrodes 21, i.e., by applying a different drive voltage to each strip-like electrode 21, electric fields of different intensities are formed by the strip-like electrodes 21 with cooperation of the common electrode 11 respectively, so that the liquid crystal molecules lying in different regions are subjected to different degrees of deflection, thereby enabling the liquid crystal layer to achieve a lens-like effect. By combining the liquid crystal lens with a display panel, a viewer is allowed to view left-eye images with only left eye and right-eye images with only right eye, so that the viewer can perceives a stereoscopic display feeling.

However, the liquid crystal lens described above needs a driver circuit to apply different drive voltages to different strip-like electrodes 21, so as to form gradient electric fields required for forming the liquid crystal lens, but as for such gradient electric fields obtained in this way, the drive mode is relatively complex, which is disadvantageous for promotion and development of the liquid crystal lens. Therefore, how to improve the drive mode of a liquid crystal lens nowadays has become an urgent problem to be solved.

SUMMARY

Embodiments of the present invention provide a liquid crystal lens and a stereoscopic display device, for improving the drive mode of the liquid crystal lens.

One aspect of the present invention provides a liquid crystal lens, comprising: a first substrate and a second substrate which are provided opposite to each other, a plurality of lens units provided between the first substrate and the second substrate, and a driver circuit electrically-connected with the plurality of lens units respectively. Each lens unit comprises: a common electrode provided on the surface of the first substrate facing the second substrate, a signal electrode provided on the surface of the second substrate facing the first substrate and opposite to the common electrode, and a liquid crystal layer provided between the common electrode and the signal electrode. Each signal electrode comprises: one or two electrically-conductive wires with one end being electrically-connected to the driver circuit, and a resistive block provided on the surface of the second substrate facing the first substrate and opposite to the common electrode. The resistive block is electrically-connected with the one or two conductive wires, a connection portion of each conductive wire for connection with the resistive block extends along the resistive block lengthwise and has a length equal to a length of the resistive block. Where the driver circuit applies a drive voltage through the one or two conductive wires to the resistive block, the liquid crystal layer provided between the resistive block and the common electrode has a lens function. Where the liquid crystal lens is employed for a stereoscopic display device, it can project left-eye images displayed in the display panel to a viewer's left eye, and right-eye images to the viewer's right eye.

For example, in each signal electrode, the number of the conductive wire is one, and a connection zone of the resistive block for connection with the one conductive wire is located at a centerline of the resistive block, and the centerline is a straight line that runs along the resistive block lengthwise and bisects the resistive block into two parts. For example, the connection portion of the one conductive wire for connection with the resistive block is located at a zone of the resistive block corresponding to the centerline, and bisects the resistive block into two parts that are not directly connected.

For example, in each signal electrode, the number of the conductive wires is two, and the connection zones of the resistive block for connection with the two conductive wires respectively are located on both ends of the resistive block that are symmetric about the centerline, and the centerline is a straight line that runs along the resistive block lengthwise and bisects the resistive block into two parts. For example, the resistive block has a uniform electrical resistivity; along the lengthwise direction of the resistive block, on the surface of the resistive block facing the liquid crystal layer, there is opened up a groove from one end of the resistive block to the other end, and the groove has a cross-section of an are shape in a widthwise direction and symmetry about the centerline, moreover, any straight line in the bottom surface of the groove and parallel to the centerline has any point thereon being equidistant to the bottom surface of the resistive block facing the second substrate, so that the resistive block has an electrical resistance that increases gradually from the both ends of the resistive block to the zone of the resistive block corresponding to the centerline in the widthwise direction.

For example, the groove has a cross-section of a circular-arc or elliptical-arc shape in the widthwise direction.

For example, the resistive block has electrical resistivity that decreases gradually from the both ends of the resistive block to the zone of the resistive block corresponding to the centerline in the widthwise direction, and accordingly, the resistive block has an electrical resistance that increases gradually from the both ends of the resistive block in the widthwise direction to the zone of the resistive block corresponding to the centerline.

For example, the resistive block is a zinc oxide resistive block, an indium-gallium-zinc oxide resistive block, a nano-silver resistive block or a graphene resistive block.

For example, a plurality of the resistive blocks are of an integrated structure.

Another aspect of the present invention further provides a stereoscopic display device, comprising: a display panel, and a liquid crystal lens in accordance with any of the above-described technical solutions.

In the liquid crystal lens provided by the embodiment of the invention, the driver circuit assign a same drive voltage to each signal electrode, so that each lens unit in the liquid crystal lens is enabled to have a lens function; therefore, compared with the liquid crystal lens mentioned in the background art, the liquid crystal lens of the embodiment of the invention improves the drive mode of the liquid crystal lens, and thus is more advantageous for promotion and development of the liquid crystal lens.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

REFERENCE NUMERALS

1—Lens unit; 2—Display panel; 3—First sub-pixel group; 4—Second sub-pixel group; 10—First substrate; 11—Common electrode; 12—First alignment film; 20—Second substrate; 21—Strip-like electrode; 22—Resistive block; 23—Groove; 24—Second alignment film; 25—Conductive wire.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In order to improve the drive mode of a conventional liquid crystal lens as illustrated in FIG. 1, an embodiment of the present invention made a modification to each signal electrode in the liquid crystal lens. Each signal electrode comprises: one or two conductive wires with one end being electrically connected to a driver circuit and a resistive block provided on the surface of a second substrate facing a first substrate and opposite to a common electrode. The resistive block is electrically connected with the one or two conductive wires, and moreover, a connection portion of each conductive wire for connection with the resistive block extends along the resistive block lengthwise direction and has a length equal to a length of the resistive block. When the driver circuit applies a drive voltage through the one or two conductive wires to the resistive block, the liquid crystal layer provided between the resistive block and the common electrode has a lens function. Therefore, in the liquid crystal lens provided by the embodiment of the invention, the driver circuit applies a same drive voltage to each signal electrode, so that the liquid crystal lens is enabled to have a lens function, which improves the drive mode of the liquid crystal lens, and thus is advantageous for promotion and development of the liquid crystal lens.

Figure 2:
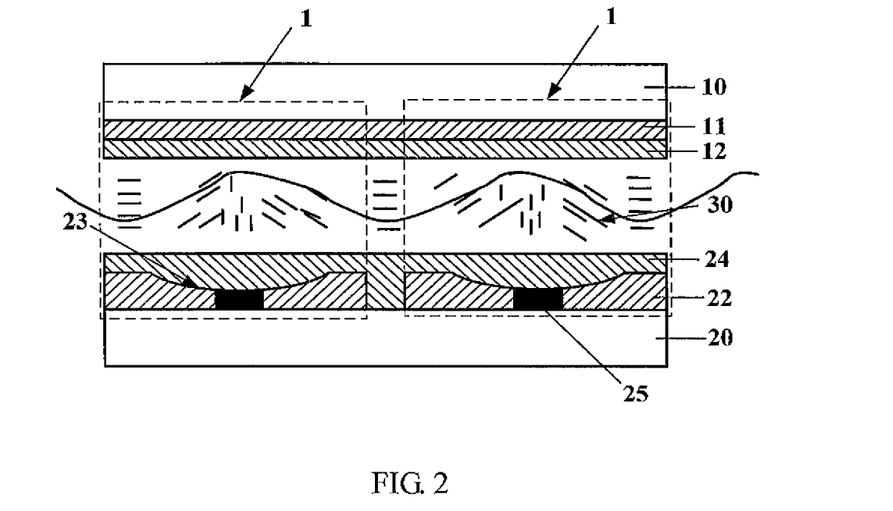
FIG. 2 is a schematic structural diagram of a liquid crystal lens provided by a first embodiment of the invention.

With reference to FIG. 2, it is a schematic structural diagram of a liquid crystal lens provided by a first embodiment of the invention; the liquid crystal lens provided by the first embodiment of the invention comprises: a first substrate 10 and a second substrate 20 which are provided opposite to each other, a plurality of lens units 1 provided between the first substrate 10 and the second substrate 20, and a driver circuit (not shown) electrically-connected with the plurality of lens units 1 respectively. Each lens unit 1 comprises: a common electrode 11 provided on the surface of the first substrate 10 facing the second substrate 20, a signal electrode provided on the surface of the second substrate 20 facing the first substrate 10 and opposite to the common electrode 11, and a liquid crystal layer 30 provided between the common electrode 11 and the signal electrode.

Each signal electrode comprises: one or two conductive wires 25 with one end being electrically-connected to the driver circuit, and a resistive block 22 provided on the surface of the second substrate 20 facing the first substrate 10 and opposite to the common electrode 11. The resistive block 22 is electrically-connected with the one or two conductive wires 25, and moreover, a connection portion of each conductive wire 25 for connection with the resistive block 22 extends along the resistive block 22 lengthwise and has a length equal to the length of the resistive block 22. When the driver circuit applies a drive voltage through the one or two conductive wires 25 to the resistive block 22, the liquid crystal layer 30 provided between the resistive block 22 and the common electrode 11 has a lens function. Thus the liquid crystal lens can project left-eye images displayed in the display panel to a viewer's left eye, and right-eye images to the viewer's right eye. The liquid crystal lens is provided at the light-exit side of the display panel, for example; and the display panel may be a liquid crystal display panel, an organic light emitting diode (OLED) display panel, an electronic-paper display panel, or the like.

For example, in practice, regarding the positional relationship between the resistive block 22 and the conductive wire(s) 25, there are mainly two cases as follows.

(1) First Case

Figure 3:
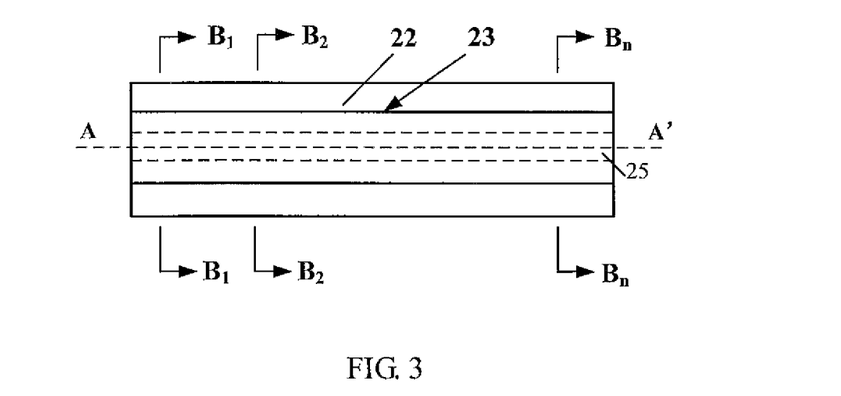
FIG. 3 is a top view of the signal electrode illustrated in FIG. 2.

With reference to FIG. 2 and FIG. 3, FIG. 3 is a top view of the signal electrode illustrated in FIG. 2. In each signal electrode, the number of the conductive wire 25 is one, and a connection zone of the resistive block 22 for connection with the one conductive wire 25 is located at the centerline AA' of the resistive block 22, and the centerline AA' is a straight line that extends along the resistive block 22 lengthwise and bisects the resistive block 22 into two parts; that is, the connection portion of the conductive wire 25 for connection with the resistive block 22 corresponds to the centerline AA' of the resistive block 22, and extends along the resistive block 22 lengthwise; and moreover, the connection portion of the conductive wire 25 for connection with the resistive block 22 has a length equal to the length of the resistive block 22. The connection portion of the conductive wire 25 for connection with the resistive block 22 may be specifically provided on the surface of the resistive block 22 facing the second substrate 20, i.e., on the bottom surface of the resistive block 22, and also may be provided on the surface of the resistive block 22 facing the first substrate 10, i.e., on the top surface of the resistive block 22; and also it may be provided inside the resistive block 22. Preferably, as illustrated in FIG. 2, the connection portion of the one conductive wire 25 for connection with the resistive block 22 is located at a zone of the resistive block 22 corresponding to the centerline AA', and bisects the resistive block 22 into two parts that are not directly connected with each other.

(2) Second Case

Figure 4:
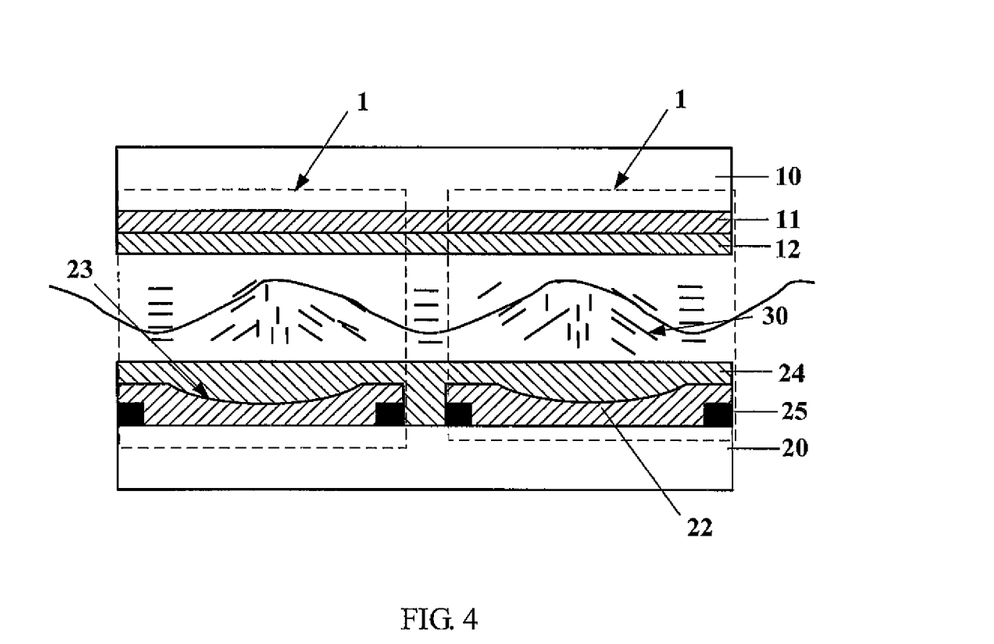
FIG. 4 is a schematic structural diagram of a liquid crystal lens provided by a second embodiment of the invention.
Figure 5:
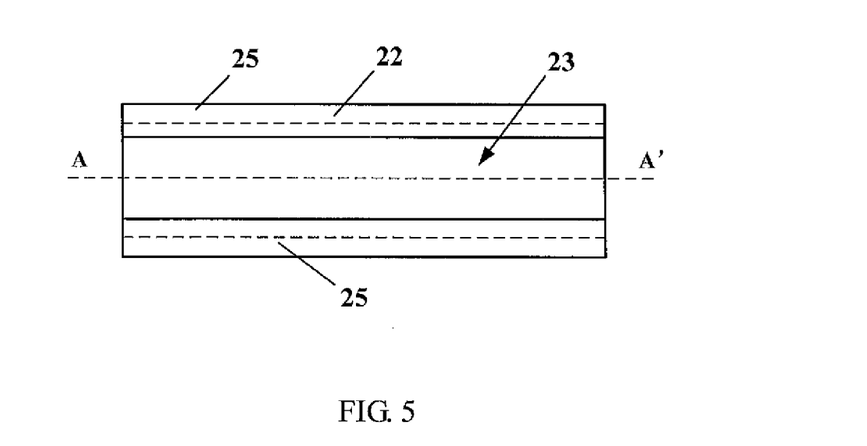
FIG. 5 is a top view of the signal electrode illustrated in FIG. 4.

With reference to FIG. 4 and FIG. 5, FIG. 4 is a schematic structural diagram of a liquid crystal lens provided by a second embodiment of the invention, and FIG. 5 is a top view of the signal electrode illustrated in FIG. 4. In each signal electrode, the number of the conductive wires 25 is two, and the connection zones of the resistive block 22 for connection with the two conductive wires 25 respectively are provided on both the ends of the resistive block 22, which ends are symmetric with respect to the centerline AA', and the centerline AA' is a straight line that extends along the resistive block 22 lengthwise and bisects the resistive block 22 into two parts. That is, the connection portions of the two conductive wires 25 for connection with the resistive block 22 are respectively provided on both ends of the resistive block 22 in the widthwise direction, and extend along the resistive block 22 lengthwise, as illustrated in FIG. 5; and moreover, the connection portion of each conductive wire 25 for connection with the resistive block 22 has a length equal to the length of the resistive block 22. The connection portion of each conductive wire 25 for connection with the resistive block 22 may be specifically provided on the surface of the resistive block 22 facing the second substrate 20, i.e., on the bottom surface of the resistive block 22, and also may be provided on the surface of the resistive block 22 facing the first substrate 10, i.e., on the top surface of the resistive block 22; and also it may be provided inside the resistive block 22.

It is should be noted that two adjacent resistive blocks 22 may share one common conductive wire 25, that is, two adjacent resistive blocks 22 can also achieve the above object with three conductive wires 25.

In the two embodiments described above, the driver circuit can apply a drive voltage to the resistive block 22, through one conductive wire 25 or possibly through two conductive wires 25. In order to enable the liquid crystal layer 30 provided between the signal electrode and the common electrode 11 to have a lens function, the structure of the resistive block 22 may be further defined in the following two examples.

FIRST EXAMPLE

The resistive block 22 has a uniform electrical resistivity, that is, the resistive block 22 at every different position thereof has a same density. Along the lengthwise direction of the resistive block 22, on the surface of the resistive block 22 facing the liquid crystal layer 30, a groove 23 is opened from one end of the resistive block 22 to the other end, and the groove 23 has a cross-section in an arc shape in the widthwise direction and symmetrical about the centerline AA'. On any straight line in the bottom surface of the groove 23 and parallel to the centerline AA', every point has an equal distance to the bottom surface of the resistive block 22 facing the second substrate 20, so that the resistive block 22 has electrical resistance that increases gradually from the both ends of the resistive block 22 in the widthwise direction to the zone of the resistive block 22 corresponding to the centerline AA'.

Specifically, again with reference to FIG. 2 and FIG. 3, on the surface of the resistive block 22 facing the common electrode 11, there is opened up the groove 23 passing between the both ends of the resistive block 22; the groove 23 has a cross-section of an arc shape; at different places along the lengthwise direction of the resistive block 22, the cross-sections perpendicular to the lengthwise direction of the resistive block 22 have the same cross-sectional shape and area, for example, the cross-section at place $B_1$-$B_1$, the cross-section at place $B_2$-$B_2$ and the cross-section at place $B_n$-$B_n$, as illustrated in FIG. 3. Moreover, the groove 23 is symmetric about the centerline AA' that extends parallel to the resistive block 22 lengthwise and bisects the resistive block 22. That is, along the lengthwise direction of the resistive block 22, the groove 23 has a depth that is constant from one end of the resistive block 22 to the other end thereof. However, along the widthwise direction of the resistive block 22, the groove 23 has a depth that increases gradually from edges on both sides of the centerline AA' of the resistive block 22 to the zone corresponding to the centerline AA' of the resistive block 22, that is, the resistive block 22 has a thickness that decreases gradually from the both edges thereof to the center portion; accordingly, the resistive block 22 has electrical resistance that increases gradually from the both edges to the zone corresponding to the centerline AA' of the resistive block 22.

The positional relationship between the resistive block 22 and the conductive wire(s) 25 has been described in the above two embodiments, and the detailed description thereof is omitted here. When the driver circuit applies a voltage through one conductive wire 25 to the resistive block 22 and the applied voltage at this time is a positive voltage, because the connection portion of the conductive wire 25 for connection with the resistive block 22 is located in the zone corresponding to the centerline AA' of the resistive block 22, and the resistive block 22 has electrical resistance that increases gradually from the both ends of the resistive block 22 to the zone corresponding to the centerline AA' of the resistive block 22 in the widthwise direction, the value of the voltage on the resistive block 22 decreases gradually from the zone corresponding to the centerline AA' of the resistive block 22 to the both ends. That is, along the widthwise direction of the resistive block 22, from the zone corresponding to the centerline AA' of the resistive block 22 to the both ends, the voltages at respective places of the resistive block 22 vary in accordance with a voltage curve of a certain regular pattern. Accordingly, the electric potential difference between the resistive block 22 and the common electrode 11 also varies in accordance with the above-mentioned voltage curve, and consequently the intensity of the electric field formed between the resistive block 22 and the common electrode 11 also varies in accordance with the above-mentioned voltage curve, so that the respective liquid crystal molecules in the liquid crystal layer 30 provided between the resistive block 22 and the common electrode 11 are subjected to different degrees of deflection, thereby enabling the liquid crystal layer 30 to achieve a lens function.

Preferably, in the embodiment described above, the groove 23 has a cross-section of a circular-arc or elliptical-arc shape in the widthwise direction. With this kind of configuration, on one hand, it is helpful to form the groove structure in the resistive block 22, and on the other hand, the voltage at the places of the resistive block 22 can change more smoothly, thereby contributing to achieving a lens function of the lens unit 1.

Where the driver circuit applies a voltage through two conductive wires 25 to the resistive block 22, the applied voltage this time is a negative voltage. Since the connection portions of the conductive wires 25 for connection with the resistive block 22 respectively is located on the both ends of the resistive block 22 in the widthwise direction, while the resistive block 22 has electrical resistance that increases gradually from the both widthwise-ends of the resistive block 22 to the zone corresponding to the centerline AA' of the resistive block 22, so the values of the voltages on the resistive block 22 increase gradually from the both ends of the resistive block 22 to the zone corresponding to the centerline AA'. That is, the values of the voltages on the resistive block 22 decrease gradually from the zone corresponding to the centerline AA' of the resistive block 22 to the both ends. Accordingly, the electric potential difference between the resistive block 22 and the common electrode 11 also varies in accordance with the above-mentioned voltage curve, and consequently the intensity of the electric field formed between the resistive block 22 and the common electrode 11 also varies in accordance with the above-mentioned voltage curve, so that the respective liquid crystal molecules in the liquid crystal layer 30 provided between the resistive block 22 and the common electrode 11 are subjected to different degrees of deflection, thereby enabling the liquid crystal layer 30 to achieve a lens function.

Further, the specific drive mode of the liquid crystal lens described above may be as follows. After completion of the manufacture of the liquid crystal cell for the liquid crystal lens, a flexible circuit board comprising the driver circuit is affixed onto the liquid crystal cell, and the driver circuit is electrically-connected, through each conductive wire 25, to each resistive block 22 and to the common electrode 11, respectively; the driver circuit is used to apply voltages to the resistive block 22 and to the common electrode 11. Specifically, the driver circuit applies a same drive voltage Vs to each resistive block 22, and applies a voltage Vc to the common electrode 11. According to the regular pattern of the variation of the electrical resistance of the resistive block 22, i.e., the electrical resistance of the resistive block 22 is maximum in the zone corresponding to the centerline AA', and is minimum on the edges on both sides of the centerline AA'; moreover, the electrical resistance of the resistive block 22 increases gradually from the both widthwise-ends of the resistive block 22 to the zone corresponding to the centerline AA' of the resistive block 22. Therefore, when a voltage is applied to the resistive block 22, the voltage closer to the zone corresponding to the centerline AA' drops more rapidly, whereas the voltage farther from the zone corresponding to the centerline AA' drops more slowly. Thus, when the resistive block 22 is in an energized state, the voltage at every place of each resistive block 22 varies in accordance with a certain voltage curve, and accordingly, the electric potential difference between each resistive block 22 and the common electrode 11 also varies in accordance with the above-mentioned voltage curve, and consequently the intensity of the electric field formed between the resistive block 22 and the common electrode 11 also varies in accordance with the above-mentioned voltage curve. Thus, the liquid crystal molecules provided between the resistive block 22 and the common electrode 11 are subjected to corresponding deflection, thereby exhibiting a lens effect.

SECOND EXAMPLE

The resistive block 22 described above has electrical resistivity that decreases gradually from the both ends of the resistive block 22 to the zone corresponding to the centerline AA' of the resistive block 22 in the widthwise direction, and accordingly, the resistive block 22 has electrical resistance that increases gradually from the both ends of the resistive block 22 to the zone corresponding to the centerline AA' of the resistive block 22 in the widthwise direction. That is, the resistive block 22 has densities that decrease gradually from the both ends of the resistive block 22 to the zone corresponding to the centerline AA' of the resistive block 22, and accordingly, the resistive block 22 has electrical resistance that increases gradually from the both ends of the resistive block 22 to the zone corresponding to the centerline AA' of the resistive block 22 in the widthwise direction. Specifically, for example, the resistive block 22 is an elongated bar-like cuboid block; along the lengthwise direction of the cuboid block, the cuboid block has the same electrical resistivity, but along the widthwise direction of the cuboid block, the cuboid block has different electrical resistivity. That is, along the widthwise direction of the cuboid block, the cuboid block has electrical resistivity that decreases gradually from the both ends of the cuboid block to the zone corresponding to the centerline AA' of the cuboid block. Therefore, the resistive block 22 has electrical resistance that increases gradually from the both ends of the resistive block 22 to the zone corresponding to the centerline AA' of the resistive block 22 in the widthwise direction.

The positional relationship between the resistive block 22 and the conductive wire(s) 25 has been described in the above two embodiments, and the repeated description thereof is omitted here. When the driver circuit applies a voltage through one or two conductive wires 25 to the resistive block 22, the value of the voltage on the resistive block 22 decreases gradually from the zone corresponding to the centerline AA' of the resistive block 22 to the both ends. That is, along the widthwise direction of the resistive block 22, from the zone corresponding to the centerline AA' of the resistive block 22 to the both ends, the voltage at every place of the resistive block 22 varies in accordance with a voltage curve of a certain regular pattern, and accordingly, the electric potential difference between the resistive block 22 and the common electrode 11 also varies in accordance with the above-mentioned voltage curve, and consequently the intensity of the electric field formed between the resistive block 22 and the common electrode 11 also varies in accordance with the above-mentioned voltage curve, so that the respective liquid crystal molecules in the liquid crystal layer 30 provided between the resistive block 22 and the common electrode 11 are subjected to different degrees of deflection, thereby enabling the liquid crystal layer 30 to achieve a lens function.

Therefore, in the liquid crystal lens provided by the embodiment of the invention, the driver circuit applies a same drive voltage to each signal electrode, so that each lens unit in the liquid crystal lens is enabled to have a lens function. Compared with the liquid crystal lens mentioned in the background art, the embodiment of the present invention significantly simplifies the drive mode of the liquid crystal lens, i.e., it improves the drive mode of the liquid crystal lens, and therefore is more advantageous for promotion and development of the liquid crystal lens.

It should be noted that, the resistive block 22 and the common electrode 11 described above may be made of a transparent material; and preferably, the resistive block 22 may be a zinc oxide (ZnO) resistive block, an indium-gallium-zinc oxide (IGZO) resistive block, a gallium oxide (GaO) resistive block, a nano-silver resistive block or a graphene resistive block.

In the above-described embodiments, all the resistive blocks 22 are disconnected from each other, but the invention is not limited thereto, for example, all the resistive blocks 22 may be an integrated structure.

Figure 6:
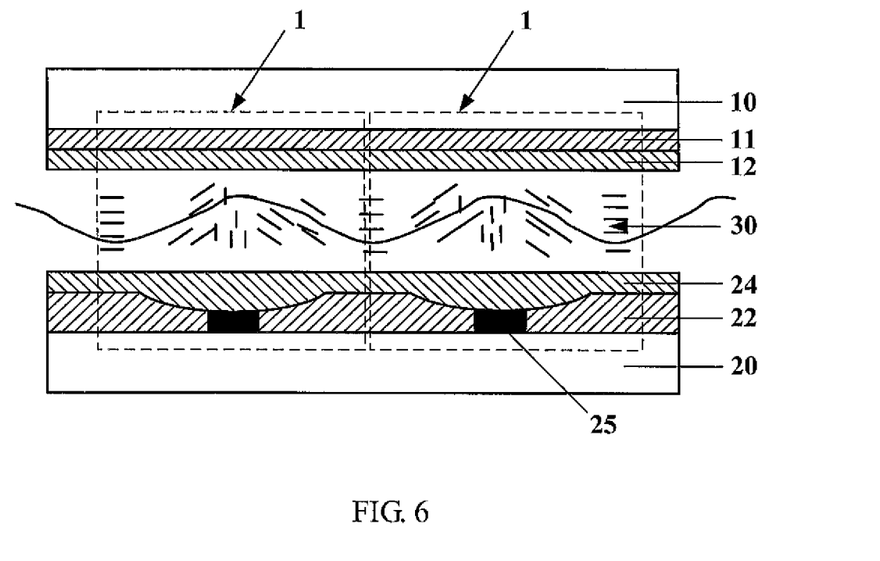
FIG. 6 is a schematic structural diagram of a liquid crystal lens provided by a third embodiment of the invention.

FIG. 6 is a schematic structural diagram of a liquid crystal lens provided by another embodiment of the invention. In this embodiment, a plurality of resistive blocks 25 are of an integrated structure, that is, all the resistive blocks 22, which are located on the surface of the second substrate 20 facing the first substrate 10, constitute a resistive layer. The portion of the resistive layer corresponding to each lens unit 1 has the same structure as the resistive block 22 described above, and the same way for connection with the conductive wire(s) 25. When the driver circuit applies a drive voltage through each conductive wire 25 to different regions of the resistive layer respectively, the voltage on the section of the resistive layer corresponding to each lens unit 1 varies in accordance with a voltage curve of a certain regular pattern, and accordingly, the electric potential difference between the section and the common electrode 11 also varies in accordance with the above-mentioned voltage curve, and consequently the intensity of the electric field corresponding to each lens unit 1 also varies in accordance with the above-mentioned voltage curve, so that the respective liquid crystal molecules in the liquid crystal layer 30 are subjected to different degrees of deflection, thereby enabling the liquid crystal layer 30 to achieve a lens function.

In order to make the respective liquid crystal molecules in each lens unit 1 easy to be aligned, further with reference to FIG. 2 or FIG. 4, preferably, each lens unit 1 may further comprise: a first alignment film 12 provided on the surface of the common electrode 11 facing the resistive block 22, and a second alignment film 24 provided on the resistive block 22 and opposite to the first alignment film 12. Such configuration makes the respective liquid crystal molecules in the liquid crystal layer 30 easy to deflect under the driving of a corresponding electric field.

Below, with a manufacturing process of the resistive block 22, the structure of the above-described resistive block 22 is further explained.

Figures 7A, 7B:
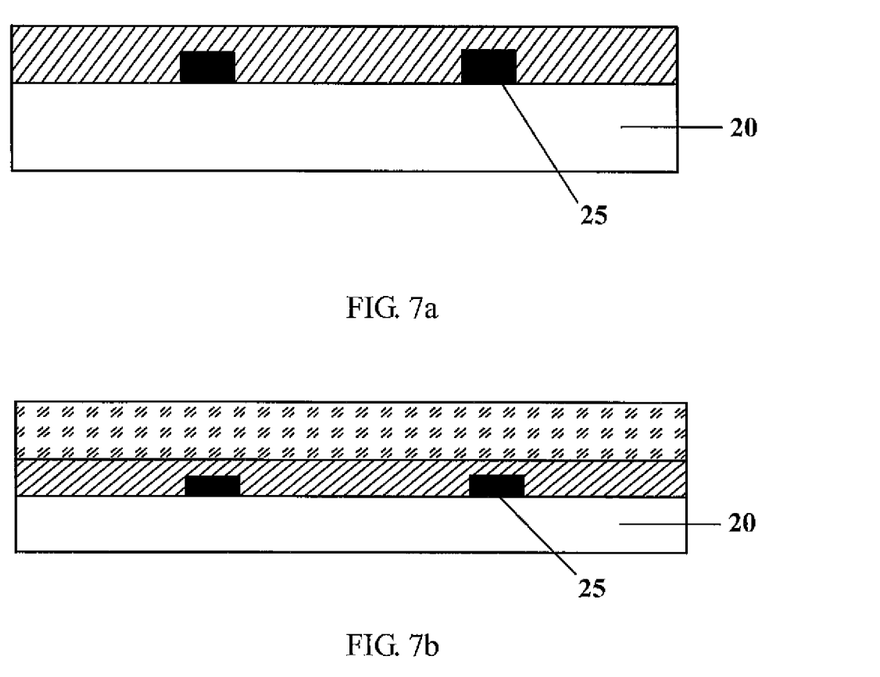
FIG. 7a is a schematic diagram of a second substrate being provided with a resistive layer.
FIG. 7b is a schematic diagram of the resistive layer being provided thereon with a photoresist layer.

First step, with reference to FIG. 7a, a second substrate is provided with a resistive layer. Specifically, firstly, on the second substrate 20, an electrically-conductive film is deposited and then formed into a plurality of conductive wires 25, and then by means of depositing, a resistive layer is deposited on the second substrate 20 and on each conductive wire 25; the resistive layer is formed of a transparent material, such as indium-tin oxide (ITO), zinc oxide (ZnO), gallium oxide (GaO) or indium-gallium-zinc oxide (IGZO) or the like.

Second step, with reference to FIG. 7b, the resistive layer is provided thereon with a photoresist layer. Specifically, by means of depositing or coating, a photoresist layer can be deposited on the resistive layer.

Figure 7C:
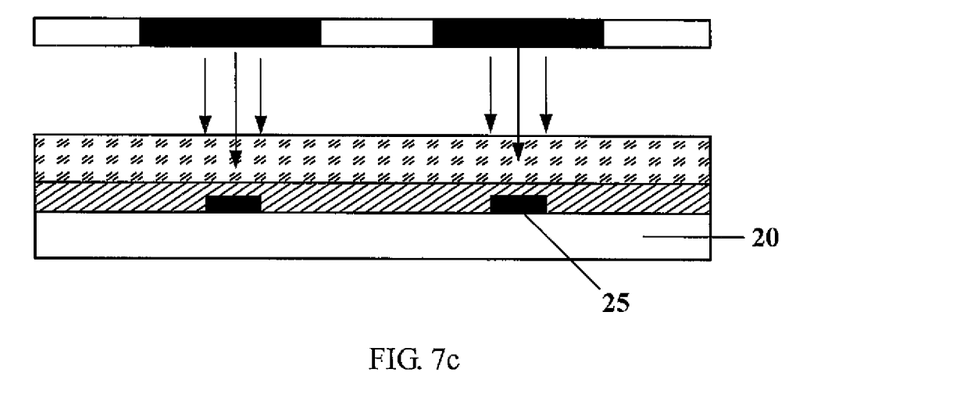
FIG. 7c is a schematic diagram of a gray-tone mask being used for gray-tone exposure of the resistive block.

Third step, with reference to FIG. 7c, a gray-tone mask is used for gray-tone exposure of the photoresist layer; in this step, a gray-tone mask with a preset pattern is used for gray-tone exposure of the photoresist layer.

Figure 7D:
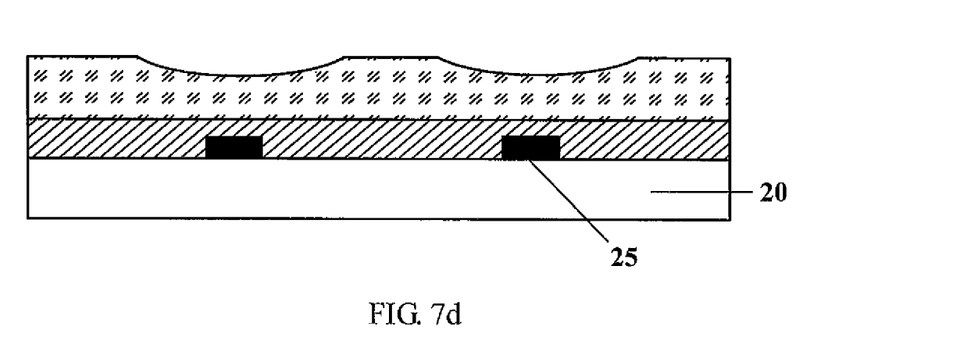
FIG. 7d is a schematic diagram of developing.

Fourth step, with reference to FIG. 7d, the photoresist layer after exposure is developed. This step performs developing, so that a desired pattern is formed on the photoresist layer.

Figure 7E:
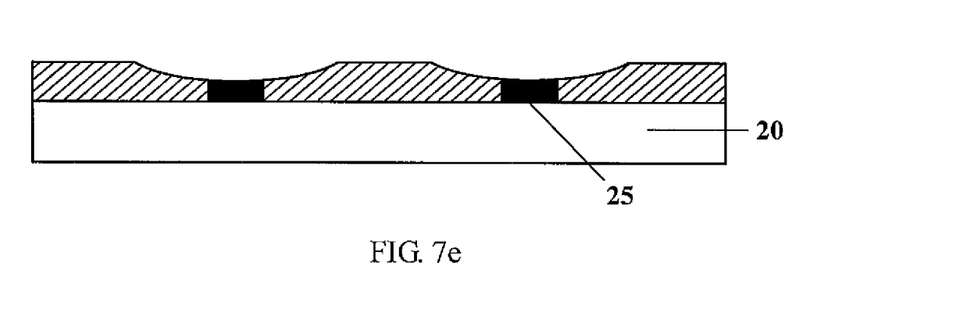
FIG. 7e is a schematic diagram of the second substrate being formed thereon with a resistive block.

Fifth step, with reference to FIG. 7e, a resistive block is formed on the second substrate; specifically, for example, by dry etching, a resistive block 22 of a desired structure is formed on the second substrate 20. In this embodiment, all the resistive blocks 22 are connected into one integrated piece. It is also possible to use other gray-tone mask, and after exposing, developing and etching, a plurality of resistive blocks 22 arranged at an equal interval are formed; the above-mentioned processes are well known to the skilled in the art, and therefore will not be described here in detail.

Figure 8:
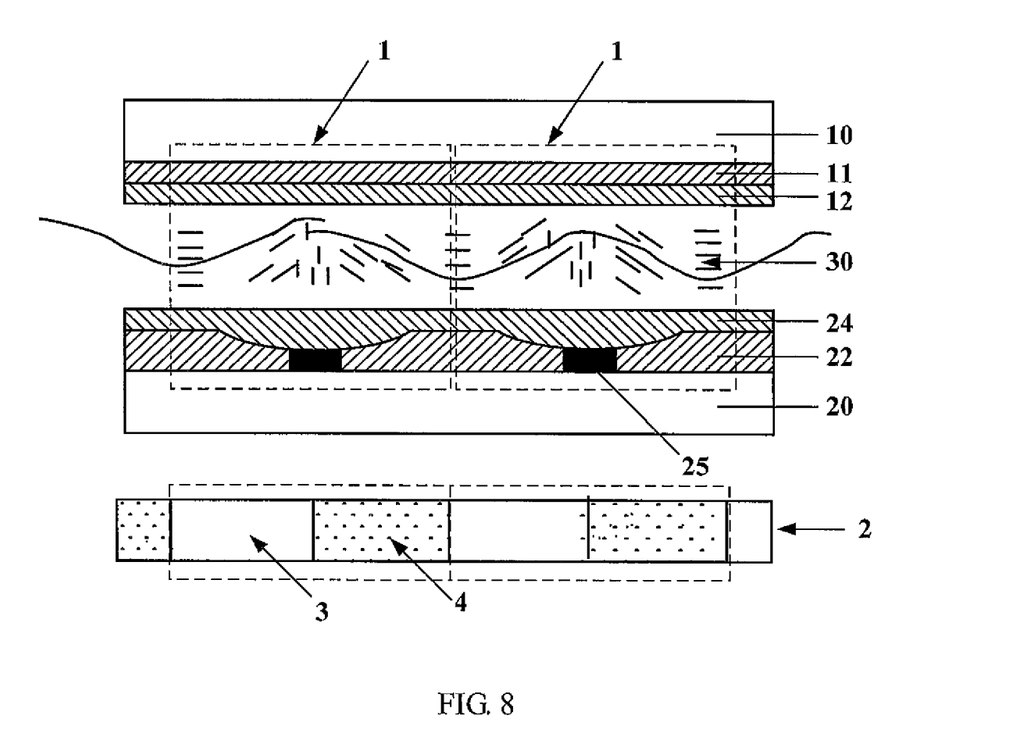
FIG. 8 is a schematic structural diagram of a stereoscopic display device provided by an embodiment of the invention.

With reference to FIG. 8, it is a schematic structural diagram of a stereoscopic display device provided by an embodiment of the invention. The stereoscopic display device provided by the embodiment of the invention comprises: a display panel 2, and a liquid crystal lens in accordance with any of the above-described technical solutions. In practice, the liquid crystal lens is located at a light-exit side of the display panel 2, and each lens unit 1 in the liquid crystal lens corresponds to one first sub-pixel 3 and one second sub-pixel 4 in the display panel 2. The first sub-pixel 3 is used to display left-eye images, and the second sub-pixel 4 is used to display corresponding right-eye images. Therefore, images displayed by the first sub-pixel 3 and the second sub-pixel 4 in each pair, after being transmitted through the liquid crystal lens, are received by a viewer's left and right eyes respectively, so that the viewer perceives a stereoscopic display effect.

It should be noted that, the stereoscopic display device may be any product or component which has a display function, such as an OLED display device, a liquid crystal display device, an electronic paper, a liquid crystal TV, a digital photo frame, a mobile phone, a tablet PC, etc; where the stereoscopic display device is a liquid crystal display device, the above-described liquid crystal lens may also be provided between a liquid crystal panel and a backlight.

In summary, the liquid crystal lens provided by the embodiment of the invention, uses a same drive voltage to drive each lens unit, so that the liquid crystal lens can have a lens function, and compared with the liquid crystal lens mentioned in the background art, it significantly simplifies the drive mode of the liquid crystal lens, and thus is more advantageous for promotion and development of the liquid crystal lens.

The above are merely exemplary implementations of the present invention, but not for limiting the scope of the invention; instead, the scope of the invention should be defined by the appended claims.

The invention claimed is:

1. A liquid crystal lens, comprising: a first substrate and a second substrate which are provided opposite to each other, a plurality of lens units provided between the first substrate and the second substrate, and a driver circuit electrically-connected with the plurality of lens units respectively;
wherein each lens unit comprises: a common electrode provided on a surface of the first substrate facing the second substrate, a signal electrode provided on a surface of the second substrate facing the first substrate and opposite to the common electrode, and a liquid crystal layer provided between the common electrode and the signal electrode;
wherein each signal electrode comprises: one or two conductive wires with one end being electrically-connected to the driver circuit; a resistive block provided on the surface of the second substrate facing the first substrate and opposite to the common electrode, wherein the resistive block is electrically-connected with the one or two conductive wires, a connection portion of each conductive wire for connection with the resistive block extends along a lengthwise direction of the resistive block and has a length equal to a length of the resistive block; where the driver circuit applies a drive voltage through the one or two conductive wires to the resistive block, the liquid crystal layer provided between the resistive block and the common electrode has a lens function, so that the liquid crystal lens can project left-eye images displayed in the display panel to a viewer's left eye, and right-eye images to the viewer's right eye.

2. The liquid crystal lens according to claim 1, wherein in each signal electrode, a number of the conductive wire is one, and a connection zone of the resistive block for connection with the one conductive wire is located at a centerline of the resistive block, and the centerline is a straight line that runs along the resistive block lengthwise and bisects the resistive block into two parts.

3. The liquid crystal lens according to claim 2, wherein the connection portion of the one conductive wire for connection with the resistive block is located at a zone of the resistive block corresponding to the centerline, and bisects the resistive block into two parts that are not directly connected.

4. The liquid crystal lens according to claim 1, wherein in each signal electrode, a number of the conductive wires is two, and connection zones of the resistive block for connection with the two conductive wires respectively are located on both ends of the resistive block symmetric with respect to a centerline, and the centerline is a straight line that runs along the resistive block lengthwise and bisects the resistive block into two parts.

5. The liquid crystal lens according to claim 1, wherein the resistive block has a uniform electrical resistivity; along, the lengthwise direction of the resistive block, on the surface of the resistive block facing the liquid crystal layer, there is opened up a groove from one end of the resistive block to the other end, and the groove has a cross-section of an arc shape in a widthwise direction and symmetry about a centerline, any straight line in the bottom surface of the groove and parallel to the centerline has any point thereon being equidistant to the bottom surface of the resistive block facing the second substrate, so that the resistive block has electrical resistance that increases gradually from the both ends of the resistive block in the widthwise direction to the zone of the resistive block corresponding to the centerline.

6. The liquid crystal lens according to claim 5, wherein the groove has a cross-section of a circular-arc or elliptical-arc shape in the widthwise direction.

7. The liquid crystal lens according to claim 1, wherein the resistive block has electrical resistivity that decreases gradually from the both ends of the resistive block to the zone of the resistive block corresponding to the centerline in a widthwise direction, and accordingly, the resistive block has electrical resistance that increases gradually from the both ends of the resistive block to the zone of the resistive block corresponding to the centerline in the widthwise direction.

8. The liquid crystal lens according to claim 1, wherein the resistive block is a zinc oxide resistive block, an indium-gallium-zinc oxide resistive block, a nano-silver resistive block or a graphene resistive block.

9. The liquid crystal lens according to claim 1, wherein a plurality of the resistive blocks are of an integrated structure.

10. A stereoscopic display device, comprising: a display panel, and a liquid crystal lens in accordance with claim 1.

11. The liquid crystal lens according to claim 2, wherein the resistive block has a uniform electrical resistivity; along the lengthwise direction of the resistive block, on the surface of the resistive block facing the liquid crystal layer, there is opened up a groove from one end of the resistive block to the other end, and the groove has a cross-section of an arc shape in a widthwise direction and symmetry about a centerline, any straight line in the bottom surface of the groove and parallel to the centerline has any point thereon being equidistant to the bottom surface of the resistive block facing the second substrate, so that the resistive block has electrical resistance that increases gradually from the both ends of the resistive block in the widthwise direction to the zone of the resistive block corresponding to the centerline.

12. The liquid crystal lens according to claim 11, wherein the groove has a cross-section of a circular-arc or elliptical-arc shape in the widthwise direction.

13. The liquid crystal lens according to claim 4, wherein the resistive block has a uniform electrical resistivity; along the lengthwise direction of the resistive block, on the surface of the resistive block facing the liquid crystal layer, there is opened up a groove from one end of the resistive block to the other end, and the groove has a cross-section of an arc shape in a widthwise direction and symmetry about a centerline, any straight line in the bottom surface of the groove and parallel to the centerline has any point thereon being equidistant to the bottom surface of the resistive block facing the second substrate, so that the resistive block has electrical resistance that increases gradually from the both ends of the resistive block in the widthwise direction to the zone of the resistive block corresponding to the centerline.

14. The liquid crystal lens according to claim 13, wherein the groove has a cross-section of a circular-arc or elliptical-arc shape in the widthwise direction.

15. The liquid crystal lens according to claim 2, wherein the resistive block has electrical resistivity that decreases gradually from the both ends of the resistive block to the zone of the resistive block corresponding to the centerline in a widthwise direction, and accordingly, the resistive block has electrical resistance that increases gradually from the both ends of the resistive block to the zone of the resistive block corresponding to the centerline in the widthwise direction.

16. The liquid crystal lens according to claim 3, wherein the resistive block has electrical resistivity that decreases gradually from the both ends of the resistive block to the zone of the resistive block corresponding to the centerline in a widthwise direction, and accordingly, the resistive block has electrical resistance that increases gradually from the both ends of the resistive block to the zone of the resistive block corresponding to the centerline in the widthwise direction.

17. The liquid crystal lens according to claim 4, wherein the resistive block has electrical resistivity that decreases gradually from the both ends of the resistive block to the zone of the resistive block corresponding to the centerline in a widthwise direction, and accordingly, the resistive block has electrical resistance that increases gradually from the both ends of the resistive block to the zone of the resistive block corresponding to the centerline in the widthwise direction.

18. The liquid crystal lens according to claim 2, wherein a plurality of the resistive blocks are of an integrated structure.

19. The liquid crystal lens according to claim 3, wherein a plurality of the resistive blocks are of an integrated structure.

20. The liquid crystal lens according to claim 4, wherein a plurality of the resistive blocks are of an integrated structure.

* * * * *